March 28, 1961  B. W. WHITEHURST  2,976,808
ROTARY THRUST PUMP
Filed June 6, 1958  2 Sheets-Sheet 1

INVENTOR.
Bert W. Whitehurst
BY
Morse & Altman
ATTORNEYS

March 28, 1961  B. W. WHITEHURST  2,976,808
ROTARY THRUST PUMP
Filed June 6, 1958  2 Sheets-Sheet 2

INVENTOR.
Bert W. Whitehurst
BY
Morse & Altman
ATTORNEYS

United States Patent Office

2,976,808
Patented Mar. 28, 1961

2,976,808

ROTARY THRUST PUMP

Bert W. Whitehurst, North Hampton, N.H., assignor to Hawkridge Metals Corporation, Boston, Mass., a corporation of Massachusetts Filed June 6, 1958, Ser. No. 740,230

11 Claims. (Cl. 103—87)

The present invention relates to the pumping of fluids and, more particularly, to a versatile rotary pump characterized by a positive fluid displacement and an induction impeller drive that operate with unusual efficacy by virtue of a few relatively simple and compact components.

The primary object of the present invention is to provide, in such a pump, a novel assembly of components including an outer annular unit (e.g. a cylinder) and an inner axial unit (e.g. an impeller) that have magnetically susceptible cores and electrically non-conducting casings, that present contiguous surfaces at least one of which defines a convoluted (e.g. helical) channel and that are journaled for rotation by bearings that may be closely adjacent. The casings permit torque to be magnetically applied between the cores but protect the cores from the fluid. The torque is generated by a rotating magnetic field that is indued without mechanical movement by an alternating current. The adjacent bearings render the construction axially compact and present minimum interference to fluid flow. The construction permits magnetic torque to be applied and motion of the fluid to be effected at the same radial distance from the axis of rotation, i.e. in the region that is optimum for both.

Other objects of the present invention will in part be obvious and will in part appear hereinafter.

The invention accordingly comprises the apparatus possessing the construction, combination of elements and arrangement of parts that are exemplified in the following detailed disclosure, the scope of which will be indicated in the appended claims.

For a fuller understanding of the nature and objects of the invention, reference should be had to the following detailed description taken in connection with the accompanying drawings, wherein.

Figure 1:
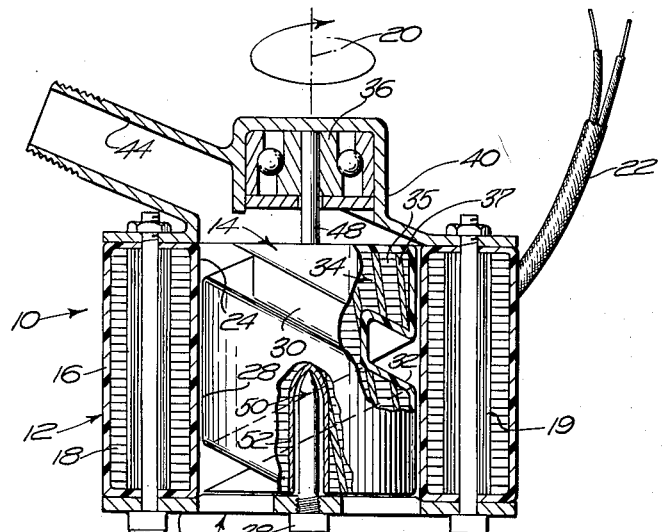
Figure 1 is a cross-sectional view of one embodiment of the present invention in the form of a sump pump.

Generally, each of the illustrated embodiments of the present invention comprises a stationary external cylinder unit, for conducting a liquid from the pump inlet to the pump outlet, and an internal rotary impeller unit, for advancing the liquid through the cylinder unit, both units having a common axis. The cylinder unit includes an annular stator core and associated windings that, when energized by a suitable single phase alternating current, cooperate with the stator core to produce a rotating magnetic field. (In modifications of the illustrated embodiments, polyphase alternating current may be employed.) The stator core is encapsulated in a casing that defines an internal periphery, which is in the form of a surface of revolution about the axis. The impeller unit includes a cylindrical rotor core that is designed to respond to torque applied by the stator core. The rotor core is encapsulated in a casing that defines an external periphery, which is in the form of a surface of revolution that is contiguous with the surface of revolution defined by the casing of the cylinder unit and that is articulated by a helical channel coiled about the axis. At any point along the axis, the cross sectional profiles of the inner periphery of the cylinder unit and the outer periphery of the impeller unit are circular. The stator core and the rotor core both include laminae, composed of a temporary magnetic metal such as soft iron, that are disposed in planes perpendicular to the axis. The rotor core also includes so-called "flux bars" in the form of flat plates, composed of a non-magnetic material, that are distributed in planes that intersect the axis of the rotor at a predetermined small angle, say 15°, and that intersect the outer periphery of the rotor along ellipsoidal equidistant curves. These flux bars isolate portions of the rotor core from neighboring portions thereof in order to concentrate flux where desired. The casings are composed of an inorganic non-metal such as glass or an organic polymer such as methyl methacrylate. Preferably, the portion of the casing that spaces the stator core from the inner periphery of the cylinder unit or the portion of the casing that spaces the rotor core from the outer periphery of the impeller unit ranges from 0.5 to 15.0 thousandths of an inch in thickness. Preferably the outer periphery of the impeller unit is spaced from the inner periphery of the cylinder unit by a distance ranging from 0.5 to 15.0 thousandths of an inch. The impeller unit is mounted for rotation at two points on its axis so that its bearings do not appreciably interfere with the flow of fluid therealong. The arrangement is such that the region in which torque is applied by the stator core to the rotor core and the region in which axial displacement is imparted to the liquid are mutually inclusive. In other words, magnetic torque is imparted to the impeller unit and mechanical force is imparted to the liquid at a radial distance from the axis that is optimum for both.

Figure 1 discloses a sump pump 10 to be used, for example, in marine craft or household cellars. Pump 10 comprises a cylinder unit 12 and an impeller unit 14. Cylinder unit 12 includes a casing 16, composed of an electrically non-conducting material, and a stator core 18 in the form of annular laminae, composed of a temporary magnetic material, which lie in planes that are perpendicular to the axis 20 of pump 10. Stator core 18 includes coils 19, which when subjected to an appropriate alternating current supplied through a cord 22, generate a magnetic field that rotates about axis 20. Casing 16, the internal periphery of which provides a liquid path 24, completely seals stator core 18 from liquid advancing through path 24 as well as from external conditions and substances, i.e., humidity, vapor, dust, etc. Impeller unit 14, which defines an external periphery 28 articulated by a helical channel 30, includes a casing 32 composed of an electrically non-conducting material, and a rotor core 34 in the form of horizontal laminae 35 that are composed of a temporary magnetic material and oblique flux bars 37 that are composed of a non-magnetic electrical conductor. In a plane perpendicular to axis 20, the periphery of impeller unit 14 has a circular profile that is broken by the reentrant notch defining channel 30. Casing 32 seals rotor core 34 from liquid within cylinder unit 12. It is apparent that torque is imparted by stator core 18 through casing 16 and casing 32 and the fluid therebetween to rotor core 34.

Impeller unit 14 is journaled for rotation by bearings 36 and 38 which, respectively, are mounted on an upper cover 40 and a lower base 42. Cover 40 provides an outlet nozzle 44. Base 42 provides an inlet port 46. Cover 40 and base 42 are secured to the upper and lower extremities of cylinder unit 12. As shown, bearing 36 is a ball bearing assembly, of which the outer race is secured to cover 40 and the inner race is secured to a shaft 48 which projects from impeller unit 14 along axis 20. Bearing 38 includes an upstanding pin 50 which projects into a bore sleeve 52 within impeller unit 14 along axis 20. The apices of pin 50 and bore sleeve 52 are in rotating contact. Preferably, shaft 48, pin 50 and bore sleeve 52 are composed of a corrosion resistant metal such as stainless steel or Phosphor bronze. A water insoluble paraffin wax may be applied to the apices of pin 50 and bore sleeve 52 and to the races of bearing 36 as a lubricant.

Figure 2:
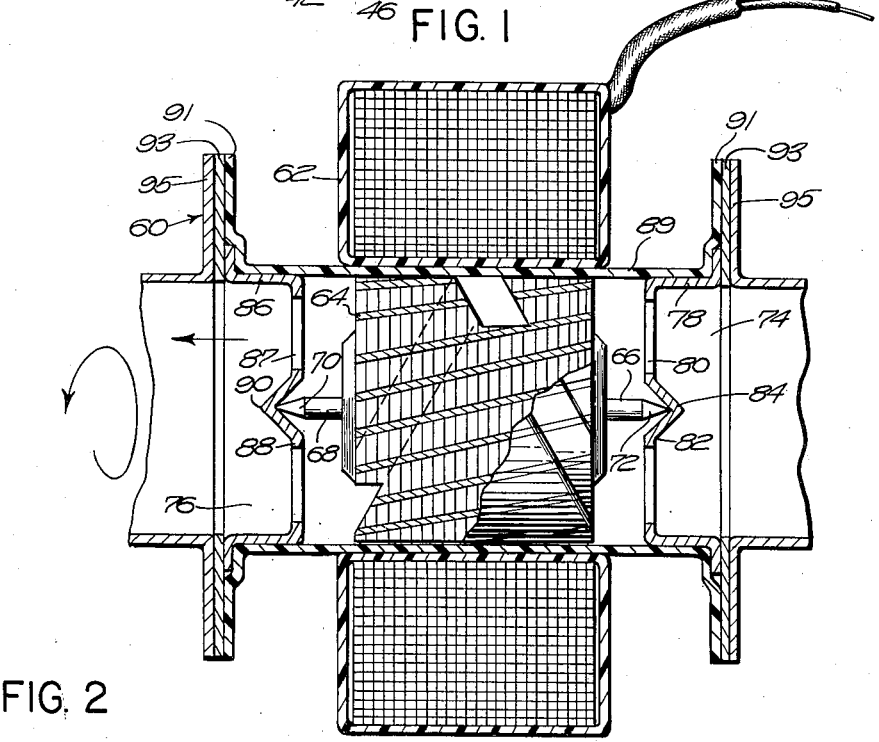
Fig. 2 is a cross-sectional view of another embodiment of the present invention in the form of an in-line pump for use with inflammable and corrosive fluids.

Figure 2 shows a pump 60 for transporting corrosive fluids such as acids, alkalis, solvents and other chemical materials that normally are difficult to pump because of their corrosive effect upon pump linings, packings, etc. and for transporting inflammable fluids such as fuel oil, gasoline, kerosene, for example, in aircraft fuel systems. Generally, pump 60 comprises a cylinder unit 62 and an impeller unit 64 that are similar to cylinder unit 12 and impeller unit 14, respectively, in construction. As shown, impeller unit 64 is journaled as follows. Extending axially from opposite extremities of impeller unit 64 are shafts 66 and 68 that have needle point extremities 70 and 72. Fitted into the opposed ports of the inner periphery of cylinder unit 62 are a pair of reticulated cups 74 and 76. Cup 74 includes a tubular portion 78 that constitutes a nozzle inlet, a spider portion 80 that offers minimum interference to incoming liquid flow and a bearing portion 82 providing a needle point depression 84 that receives needle point extremity 72 for rotation. Cup 76 includes a tubular portion 86 that constitutes a nozzle outlet, a spider portion 87 that offers minimum interference to outgoing liquid flow and a bearing portion 88 providing a needle point depression 90 that receives needle point extremity 70 for rotation. As shown, core 62 is mounted on or around a non-metallic tube 89 provided at each end with a suitable flange 91. Flange 91 is designed to be locked against the flange 95 of a pipe with a gasket 93 therebetween. Rotor 64 is mounted within tube 89 and within the magnetic field of core 62. This assembly, which is installed directly in the piping system, constitutes an integral component thereof. Pump 60, which operates directly in-line and which requires no lubrication on its bearings, omits all component linings, lubrication points or the like that might be affected by the corrosive liquids for which it is designed.

Figure 3:
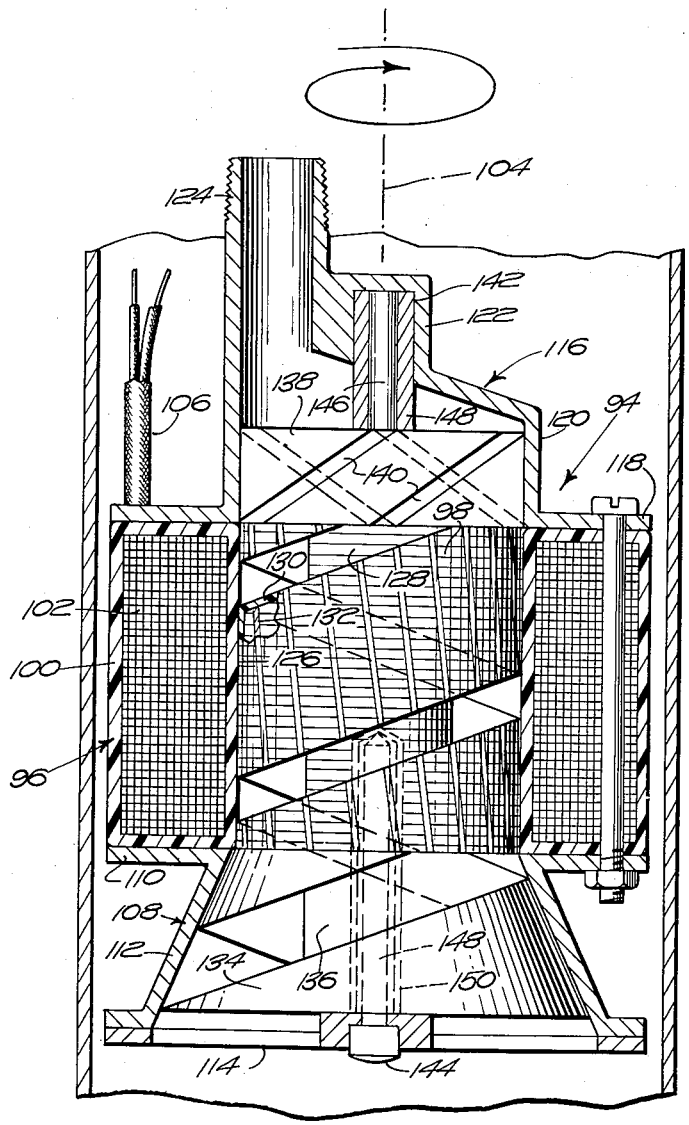
Fig. 3 is a further embodiment of the present invention in the form of a pump for general use in water systems.

Figure 3 shows a pump 94 for general use in household water systems and the like. Generally, pump 94 comprises a cylinder unit 96 and an impeller unit including a medial impeller portion 98.

Cylinder unit 96 includes a casing 100, composed of an electrically non-conducting material, and a stator core 102 in the form of annular laminae, composed of a temporary magnetic material, which lie in planes that are perpendicular to the axis 104 of pump 94. Stator 102 is associated with coils, which when subjected to an appropriate alternating current supplied through a cord 106, generate a magnetic field that rotates about axis 104. Connected to cylinder unit 96 at its lower extremity is a base housing 108 which includes an annular flange portion 110 that is similar to cylinder unit 96 in external diameter, an upwardly converging conical portion 112 the upper inner periphery of which is similar to cylinder unit 96 in internal diameter, and a spider portion 114 which constitutes a water inlet. Connected to cylinder unit 96 at its upper extremity is a cover housing 116 which includes an annular flange portion 118 that is similar to cylinder unit 96 in external diameter, an upwardly directed tube portion 120 the lower periphery of which is similar to the internal periphery of cylinder unit 96 in diameter, a bearing portion 122 and an eccentric nozzle portion 124 defining an outlet port.

Impeller portion 98, which defines an external periphery 126 articulated by a helical channel 128, includes a casing 130 composed of an electrically non-conducting material, and a rotor core 132 including laminae, composed of a temporary magnetic material, and flux bars, composed of a non-magnetic electrical conducting material. In a cross-sectional plane perpendicular to axis 104, impeller portion has a circular profile that is broken by the re-entrant notch defining channel 128.

Diverging downwardly from medial impeller portion 98 is an entrance impeller portion 134 that is frustroconical in shape. Impeller portion 134 has an upper face that is secured to the lower face of medial impeller portion 98 and a lower face that is only slightly smaller in cross-sectional radius than the surface of conical portion 112 to which it is adjacent. The tapering periphery of entrance impeller portion 134 is articulated by a helical channel 136. Entrance impeller portion 134, in any cross-sectional plane perpendicular to axis 104, has a circular profile that is broken by a re-entrant notch defining channel 136.

Continuing upwardly from medial impeller portion 98 is an exit impeller portion 138 that is like impeller portion 98 in cross-sectional profile. The lower face of exit impeller portion 138 is secured to the upper face of medial impeller portion 98. The cylindrical periphery of exit impeller portion 138 is articulated by helical channels 140. Exit impeller portion 138, in any cross sectional plane perpendicular to axis 104, has a circular profile that is broken by re-entrant notches defining channels 140.

The impeller of Figure 3 is journaled for rotation by bearings 142 and 144 which, respectively, are mounted on cover housing 116 and base housing 108. As shown, bearing 142 includes a shaft 146 that extends axially from exit impeller portion 138 and a bushing 148 that extends axially from cover housing 116. As shown, bearing 144 includes an upstanding pin 148 which projects into a bore sleeve 150 within entrance impeller portion 134 and medial impeller portion 98 along axis 104. The apices of pin 148 and bore sleeve 150 are in rotating contact.

Preferably, the components of bearings 142 and 144 are composed of a non-corroding metal such as Phosphor bronze or stainless steel. Entrance and exit impeller portions 134 and 138, for example, are composed of an organic polymer such as phenol formaldehyde or a light metal such as aluminum. In cross-sectional planes perpendicular to axis 104, the re-entrant notch defining channel 128 is greater in area than either of the cross-sectional notches defined by channels 140 and is smaller in area than the cross-sectional notch defined by channel 136. This arrangement renders the exit velocity of the liquid greater than its entrance velocity.

When the pumps of Figures 1, 2 and 3 are operating, their fluid contacting surfaces provide few interruptions in continuity that might give rise to clogging. For example, in axial cross-section, major proportions of the internal periphery of the cylinder unit and the external periphery of the impeller unit are characterized by uninterrupted linear profiles, the only exception being in the areas of the helical channels.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A pump comprising an outer cylinder unit and an inner impeller unit, said cylinder unit including a first casing and an induction stator core, said first casing being composed of an electrically non-conducting material and presenting an internal fluid conducting periphery, said stator being capable of producing a rotating magentic field within said periphery when energized by an alternating current, said impeller unit including a second casing and an induction rotor core, said second casing being composed of an electrically non-conducting material and presenting an external periphery articulated by a convoluted channel, said external periphery and said internal periphery being contiguous except at portions thereof articulated by said channel, said internal periphery of said cylinder unit and said external periphery of said impeller unit having a common axis, said stator core and said rotor core including laminae disposed in planes that are substantially perpendicular to said axis, said convoluted channel being disposed between said stator core and said rotor core, said laminae of said rotor core providing reentrant boundaries in contiguity with said channel.

2. The pump of claim 1 wherein said internal periphery of said cylinder unit and said external periphery of said impeller unit are contiguous.

3. The pump of claim 1 wherein said internal periphery of said cylinder unit and said external periphery of said impeller unit are spaced from each other by from 0.5 to 15.0 thousandths of an inch.

4. The pump of claim 1 wherein said first casing at said internal periphery of cylinder unit ranges in thickness from 0.5 to 15.0 thousandths of an inch and said second casing at said external periphery of said impeller unit ranges in thickness from 0.5 to 15.0 thousandths of an inch.

5. A pump comprising an outer stationary unit and an inner rotatable unit, said outer stationary unit including a casing and an induction stator core, said casing being composed of an electrically non-conducting material and presenting an internal fluid conducting periphery, said stator being capable of producing a rotating magnetic field within said periphery when energized by an alternating current, said inner rotatable unit including a casing and an induction rotor core, said casing being composed of an electrically non-conducting material and presenting an external periphery articulated by one convoluted channel, said external periphery and said internal periphery being contiguous except at portions thereof articulated by said channel, said internal periphery of said cylinder unit and said external periphery of said impeller unit being spaced from each other by from 0.5 to 15.0 thousandths of an inch, said first casing at said internal periphery of said cylinder unit ranging in thickness from 0.5 to 15.0 thousandths of an inch and said second casing at said external periphery of said impeller unit ranging in thickness from 0.5 to 15.0 thousandths of an inch, said convoluted channel being disposed between said stator core and said rotor core, said rotor core providing reentrant boundaries in contiguity with said channel.

6. The pump of claim 5 wherein said impeller unit is journaled on bearings associated with said cylinder unit, at least one of said bearings being provided by an axial bore in said impeller unit and a shaft carried by said cylinder unit, the inner portion of said bore and the extremity of said pin being in rotatable contact.

7. The pump of claim 5 wherein said impeller unit is journaled on bearings associated with said cylinder unit, said bearings including means carried by said cylinder unit providing opposed pointed depressions, and shafts extending from said impeller unit having pointed extremities, said pointed depressions and said pointed extremities being in rotatable contact.

8. The pump of claim 5 wherein said impeller unit includes a plurality of portions presenting peripheries articulated by convoluted channels of different cross-sectional areas.

9. A pump comprising an outer stationary unit and an inner rotatable unit, said outer stationary unit providing an inlet and an outlet in association with opposed axial extremities of said rotatable unit, said outer stationary unit including a casing and an induction stator core, said casing being composed of an electrically non-conducting non-metal and presenting an internal fluid conducting periphery, said stator core being composed of magnetic metal containing laminae capable of producing a rotating magnetic field within said periphery when energized, said inner rotatable unit including a casing and an induction rotor core, said casing of said inner rotatable unit being composed of an electrically non-conducting non-metal and presenting an external periphery articulated by one convoluted channel, said rotor core being composed of magnetic metal containing laminae adapted to cause said inner rotatable unit to rotate in response to said magnetic field, said external periphery and said internal periphery being contiguous except at portions thereof articulated by said channel, said convoluted channel being disposed between said stator core and said rotor core, said rotor core providing reentrant boundaries in contiguity with said channel, said internal periphery and said external periphery being spaced from each other by from 0.5 to 15.0 thousandths of an inch, said casing presenting said internal periphery ranging in thickness from 0.5 to 15.0 thousandths of an inch and said casing presenting said external periphery ranging in thickness from 0.5 to 15.0 thousandths of an inch.

10. The pump of claim 9 wherein said non-metal is an inorganic material.

11. The pump of claim 9 wherein said non-metal is an organic polymer.

References Cited in the file of this patent

UNITED STATES PATENTS

| | | |
|---|---|---|
| 2,485,408 | Pezillo | Oct. 18, 1949 |
| 2,747,512 | Fouche | May 29, 1956 |
| 2,807,395 | Korte | Sept. 24, 1957 |
| 2,847,936 | Richter | Aug. 19, 1958 |
| 2,851,955 | Lapp | Sept. 16, 1958 |

FOREIGN PATENTS

| | | |
|---|---|---|
| 345,574 | Great Britain | Mar. 26, 1931 |